US012214537B2

(12) United States Patent
Takeuchi et al.

(10) Patent No.: US 12,214,537 B2
(45) Date of Patent: Feb. 4, 2025

(54) EXTRUDER FOR MANUFACTURING STRAND (71) Applicant: THE JAPAN STEEL WORKS, LTD., Tokyo (JP)

(72) Inventors: Takahide Takeuchi, Tokyo (JP); Kouki Morishita, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 24 days.

(21) Appl. No.: 17/767,434

(22) PCT Filed: Jun. 4, 2020

(86) PCT No.: PCT/JP2020/022061
§ 371 (c)(1),
(2) Date: Apr. 8, 2022

(87) PCT Pub. No.: WO2021/075081
PCT Pub. Date: Apr. 22, 2021

(65) Prior Publication Data
US 2023/0373151 A1 Nov. 23, 2023

(30) Foreign Application Priority Data
Oct. 18, 2019 (JP) .................. 2019-190693

(51) Int. Cl.
*B29C 48/92* (2019.01)
*B29B 7/72* (2006.01)
(Continued)

(52) U.S. Cl.
CPC .............. *B29C 48/92* (2019.02); *B29B 7/726* (2013.01); *B29B 9/06* (2013.01); *B29C 48/05* (2019.02);
(Continued)

(58) Field of Classification Search
CPC .... B29C 48/2556; B29C 48/268; B29C 48/92
See application file for complete search history.

(56) References Cited

U.S. PATENT DOCUMENTS 5,788,998 A 8/1998 Gross
10,611,074 B2 * 4/2020 Takeuchi .............. B29C 48/251
(Continued)

FOREIGN PATENT DOCUMENTS

CN 1141018 A 1/1997
CN 209095950 U 7/2019
(Continued)

OTHER PUBLICATIONS

Machine translation of CN 209095950 U, Jul. 12, 2019 (Year: 2019).*
(Continued)

*Primary Examiner* — Benjamin A Schiffman
(74) *Attorney, Agent, or Firm* — Potomac Law Group, PLLC (57) ABSTRACT An extruder according to an embodiment includes: a screw configured to rotate around a rotation axis extending in one direction; a cylindrical cylinder extending in the one direction, the cylinder being configured to house the screw; a drive unit disposed at one end of the cylinder, the drive unit being configured to rotate the screw; a die disposed at the other end of the cylinder, the die being configured to discharge a raw material kneaded by the rotation of the screw a as a strand; an adjustment unit disposed between the cylinder and the die, the adjustment unit being configured to adjust a flow-velocity distribution of the raw material flowing into the die; and a detection unit configured to detect a discharge amount of the strand discharged from the die.

9 Claims, 9 Drawing Sheets (51) Int. Cl.
*B29B 9/06* (2006.01)
*B29C 48/05* (2019.01)
*B29C 48/25* (2019.01)
*B29C 48/255* (2019.01)
*B29C 48/345* (2019.01)
*B29C 48/00* (2019.01)

(52) U.S. Cl.
CPC ...... *B29C 48/2526* (2019.02); *B29C 48/2552* (2019.02); *B29C 48/2556* (2019.02); *B29C 48/345* (2019.02); *B29C 48/0022* (2019.02); *B29C 2793/0027* (2013.01); *B29C 2793/009* (2013.01); *B29C 2948/92019* (2019.02); *B29C 2948/92209* (2019.02); *B29C 2948/92514* (2019.02); *B29C 2948/92704* (2019.02)

(56) References Cited

U.S. PATENT DOCUMENTS

| | | | |
|---|---|---|---|
| 11,376,760 | B2* | 7/2022 | Takeuchi ............... B29B 7/483 |
| 11,534,951 | B2* | 12/2022 | Tomiyama ............. B29C 48/40 |
| 2002/0185765 | A1 | 12/2002 | Dorninger et al. |
| 2017/0173838 | A1 | 6/2017 | Takeuchi |
| 2021/0114259 | A1 | 4/2021 | Fukuzawa et al. |
| 2022/0274309 | A1* | 9/2022 | Takeuchi ............... B29C 48/345 |
| 2024/0075671 | A1* | 3/2024 | Fukuzawa ............... B29B 7/728 |

FOREIGN PATENT DOCUMENTS

| | | | | |
|---|---|---|---|---|
| EP | 1930143 | A2 | 6/2008 | |
| JP | S63-18209 | U | 2/1988 | |
| JP | H06234149 | A * | 8/1994 | ............ B29C 48/92 |
| JP | H07-232322 | A | 9/1995 | |
| JP | H08-197608 | A | 8/1996 | |
| JP | 3038081 | U | 3/1997 | |
| JP | H09-248848 | A | 9/1997 | |
| JP | H10-278093 | A | 10/1998 | |
| JP | 2001-315119 | A | 11/2001 | |
| JP | 2002079568 | A * | 3/2002 | ............ B29C 48/92 |
| JP | 2003-285321 | A | 10/2003 | |
| JP | 2004-268274 | A | 9/2004 | |
| JP | 5753006 | B2 | 7/2015 | |
| JP | 2016-007819 | A | 1/2016 | |
| JP | 2018-001649 | A | 1/2018 | |
| JP | 2019-072920 | A | 5/2019 | |
| JP | 2019-089250 | A | 6/2019 | |
| WO | 2020/195859 | A1 | 10/2020 | |
| WO | 2022/185623 | A1 | 9/2022 | |

OTHER PUBLICATIONS

Machine translation of JP H09248848 A, Sep. 22, 1997 (Year: 1997).*
International Search Report from International Patent Application No. PCT/JP2020/022061, Aug. 11, 2020.
Office Action issued Jan. 31, 2024, in Chinese Patent Application No. 202080072970.6.
Extended European Search Report issued Oct. 2, 2023, in European Patent Application No. 20876646.9.
Office Action issued Jul. 29, 2024, in Chinese Patent Application No. 202080072970.6.

* cited by examiner

EXTRUDER FOR MANUFACTURING STRAND

TECHNICAL FIELD

The present invention relates to an extruder and a method for manufacturing strands.

BACKGROUND ART

Patent Literatures 1 and 2 disclose extruders each of which is configured to make the discharge amount of strands discharged from a die uniform.

CITATION LIST

Patent Literature

Patent Literature 1: Japanese Unexamined Patent Application Publication No. 2018-001649
Patent Literature 2: Japanese Unexamined Patent Application Publication No. 2016-007819

SUMMARY OF INVENTION

Technical Problem

As an adjustment method for making the discharge amount of strands discharged from a die uniform, there is a method in which a component such as a die is replaced. In such a case, the extruder needs to be stopped and hence productivity cannot be improved. Further, there is a limit to the level of the uniformity of the discharge amount of strands that can be achieved by the adjusting method in which a component such as a die is replaced.

Other problems to be solved and novel features will become apparent from descriptions in this specification and accompanying drawings.

Solution to Problem

An extruder according to an embodiment includes: a screw configured to rotate around a rotation axis extending in one direction; a cylindrical cylinder extending in the one direction, the cylinder being configured to house the screw; a drive unit disposed at one end of the cylinder, the drive unit being configured to rotate the screw; a die disposed at the other end of the cylinder, the die being configured to discharge a raw material kneaded by the rotation of the screw as a strand; an adjustment unit disposed between the cylinder and the die, the adjustment unit being configured to adjust a flow-velocity distribution of the raw material flowing into the die; a detection unit configured to detect a discharge amount of the strand discharged from the die; and a control unit configured to perform feedback control for the flow-velocity distribution based on the discharge amount.

A method for manufacturing a strand according to an embodiment includes: a first step of rotating a screw by a driving unit, extruding a raw material kneaded by the rotation of the screw from a die, and thereby discharging the raw material as the strand, the screw being housed in a cylindrical cylinder extending in one direction, and configured to rotate around a rotation axis extending in the one direction, the drive unit being disposed at one end of the cylinder, and the die being disposed at the other end of the cylinder; a second step of adjusting a flow-velocity distribution of the raw material flowing into the die by an adjustment unit disposed between the cylinder and the die; a third step of detecting a discharge amount of the strand discharged from the die; and a fourth step of performing feedback control for the flow-velocity distribution based on the discharge amount.

Advantageous Effects of Invention

According to the above-described embodiment, it is possible to provide an extruder and a method for manufacturing strands capable of improving the uniformity of the discharge amount of strands.

DESCRIPTION OF EMBODIMENTS

For clarifying the description, the following description and the drawings have been partially omitted and simplified as appropriate. Further, the same symbols are assigned to the same or corresponding components throughout the drawings and redundant descriptions are omitted as appropriate.

EMBODIMENT

An extruder according to an embodiment will be described. Firstly, a configuration of the extruder according to the embodiment will be described. Then, a method for manufacturing strands using the extruder according to the embodiment will be described.

<Configuration of Extruder>

Figure 1:
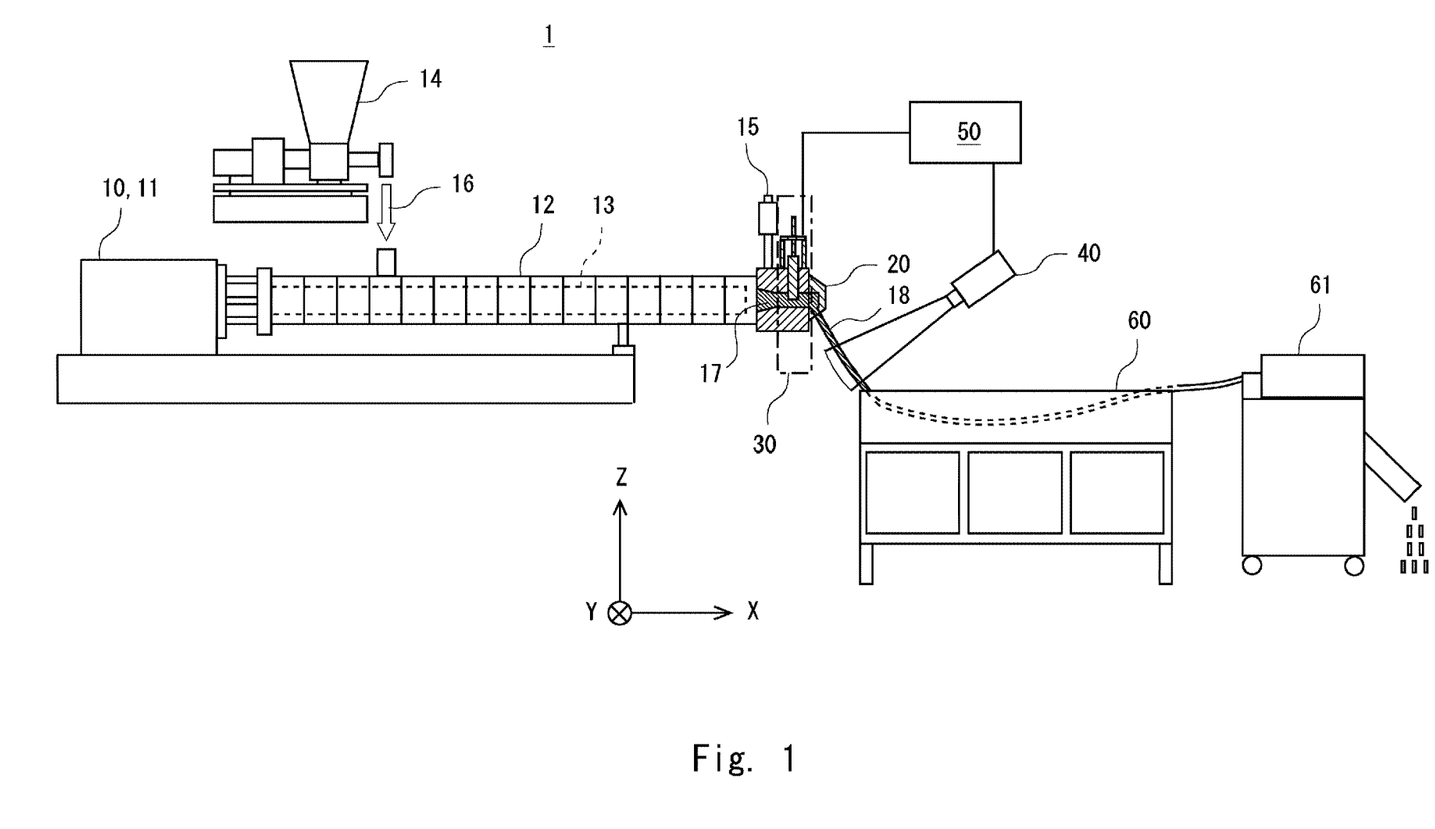
FIG. 1 is a side view showing an example of a configuration of an extruder according to an embodiment.
Figure 2:
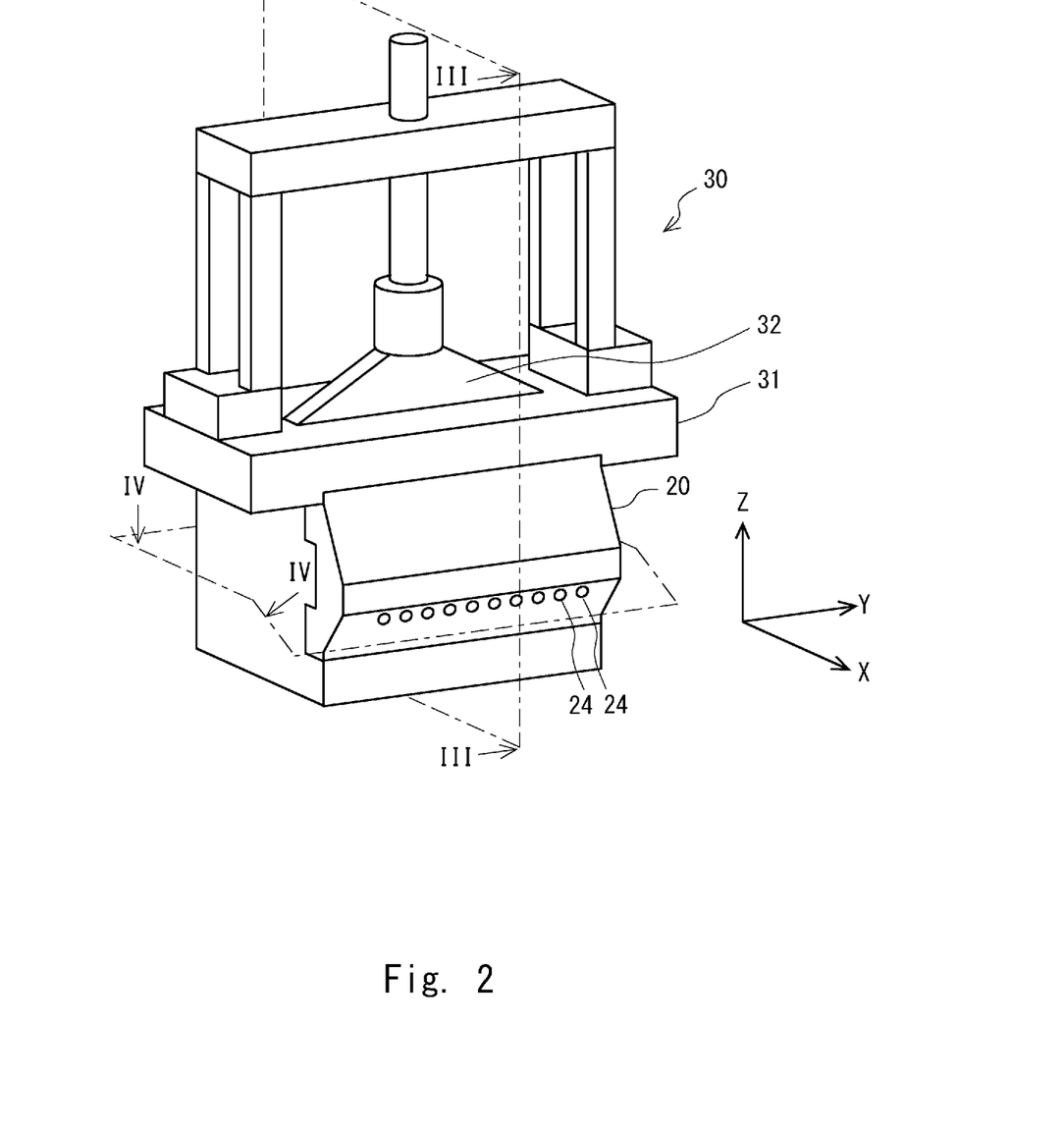
FIG. 2 is a perspective view showing an example of an adjustment unit and a die of an extruder according to an embodiment.
Figure 3:
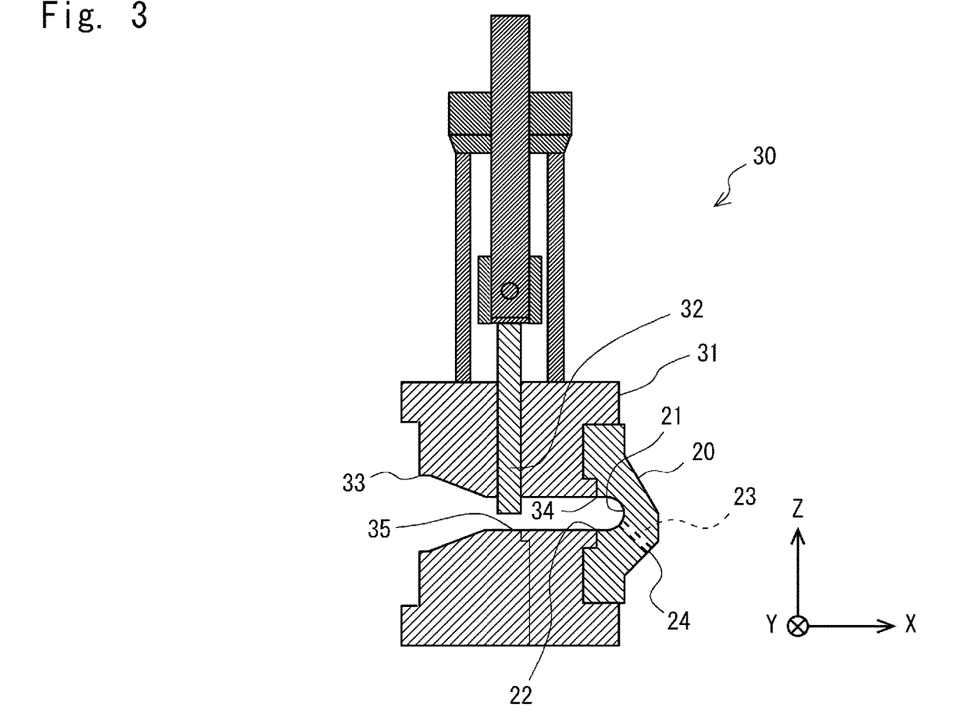
FIG. 3 is a cross-sectional diagram showing the example of the adjustment unit and the die of the extruder according to an embodiment, and shows a cross section taken along a line in FIG. 2.
Figure 4:
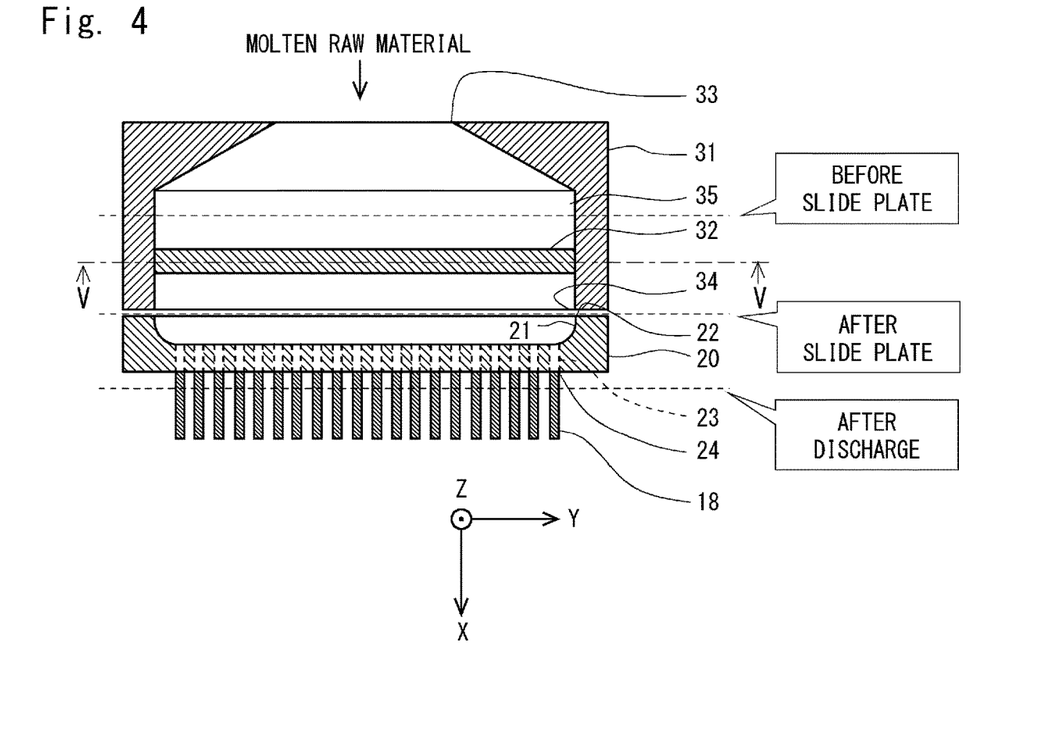
FIG. 4 is a cross-sectional diagram showing the example of the adjustment unit and the die of the extruder according to an embodiment, and shows a cross section taken along a line IV-IV in FIG. 2.

FIG. 1 is a side view showing an example of the configuration of the extruder according to the embodiment. FIG. 2 is a diagram showing an example of an adjustment unit and a die of the extruder according to the embodiment. FIG. 3 is a cross-sectional diagram showing the example of the adjustment unit and the die of the extruder according to the embodiment, and shows a cross section taken along a line in FIG. 2. FIG. 4 is a cross-sectional diagram showing the example of the adjustment unit and the die of the extruder according to the embodiment, and shows a cross section taken along a line IV-IV in FIG. 2. A part of FIG. 1 is shown as a cross section. In FIG. 4, discharged strands are shown.

As shown in FIGS. 1 to 4, the extruder 1 includes a drive unit 10, a speed reducer 11, a cylinder 12, a screw 13, a feeder 14, a pressure-gauge/thermometer 15, a die 20, an adjustment unit 30, a detection unit 40, and a control unit 50. The extruder 1 may further include a strand bath 60 and a strand cutter 61. The extruder 1 forms (i.e., molds) strands 18 by extruding a molten raw material 17, which is obtained by melting a raw material 16 such as a resin, from the die 20. The formed strands 18 are cooled in the strand bath 60. After that, the strands 18 are cut by the strand cutter 61, so that they become pellets.

Here, an XYZ-orthogonal coordinate system is introduced for the sake of explanation of the extruder 1. For example, the direction in which the cylinder 12 extends is defined as an X-axis direction, and the two directions perpendicular to the X-axis direction are defined as Y- and Z-axis directions. For example, the Z-axis direction is the vertical direction, and the XY-plane is a horizontal plane. Further, the Z-axis positive direction is upward, and the direction in which the raw material 16 is extruded by the extruder 1 is the X-axis positive direction. Each of the components/structures will be described hereinafter.

<Drive Unit, Speed Reducer>

The drive unit 10 is disposed at one end of the cylinder 12, for example, one end of the cylinder 12 on the X-axis negative side. The drive unit 10 rotates the screw 13. The drive unit 10 is, for example, a motor. The speed reducer 11 is disposed between the drive unit 10 and the screw 13. The speed reducer 11 adjusts the rotation of the drive unit 10 and transmits the rotation to the screw 13. Therefore, the screw 13 is rotated by the drive source of the drive unit 10 adjusted by the speed reducer 11.

<Cylinder>

The cylinder 12 is a cylindrical member extending in the X-axis direction. The cylinder 12 includes a hollow part inside thereof. The screw 13 is housed inside the cylinder 12. A plurality of screws 13, e.g., two screws 13, may be disposed inside the cylinder 12. In such a case, the extruder 1 is a twin-screw kneading extruder. The base part of the screw 13 on the X-axis negative side extends to the outside of the cylinder 12 from the opening thereof, and is connected to the drive unit 10 through the speed reducer 11. The opening of the cylinder 12 on the X-axis positive side is connected to the die 20 through the adjustment unit 30.

<Screw>

The screw 13 rotates around a rotation axis extending in the X-axis direction. The screw 13 rotates inside the cylinder 12. In the case where the extruder 1 is a twin-screw kneading extruder, the extruder 1 includes one screw 13 and the other screw 13. In such a case, the one screw 13 rotates around a rotation axis extending in the X-axis direction. The other screw 13 is disposed at a position adjacent to the one screw 13 in the Y-axis direction, and rotates around a rotation axis extending in the X-axis direction. For example, the other screw 13 is disposed on the Y-axis negative side of the one screw 13.

<Feeder>

The feeder 14 is disposed above a part of the cylinder 12 located on the X-axis negative side thereof. The feeder 14 feeds, for example, a raw material 16 for pellets into the cylinder 12. The raw material 16 for pellets is, for example, a resin or the like.

The raw material 16 supplied from the feeder 14 is extruded in a direction from the base part of the rotating screw 13 to the tip of the screw 13 on the opposite side, i.e., is extruded in the X-axis positive direction. The raw material 16 is melted inside the cylinder 12 by heat from a heater(s) (not shown) attached to the cylinder 12 and the effect of the rotation of the screw 13, and is transformed into a molten raw material 17. The molten raw material 17 passes through the opening of the cylinder 12 on the X-axis positive side thereof and the adjustment unit 30, and is sent to the die 20.

<Pressure-Gauge/Thermometer>

The pressure-gauge/thermometer 15 is attached at a predetermined position in the cylinder 12, the die 20, the adjustment unit 30, or the like. The pressure-gauge/thermometer 15 measures the pressure and temperature of the raw material 16, the molten raw material 17, the strands 18, and/or the like. The pressure-gauge/thermometer 15 may also measure the pressure and temperature of a gas and the like generated by the kneading of the raw material 16.

<Die>

The die 20 is disposed at the other end of the cylinder 12, for example, the end of the cylinder 12 on the X-axis positive side. A recessed part 21 is formed on the surface of the die 20 on the X-axis negative side. The opening 22 on the surface of the recessed part 21 on the X-axis negative side has, for example, a shape elongating in the Y-axis direction. The die 20 includes a plurality of die nozzles 23. The die nozzles 23 are through holes that penetrate (i.e., extend) from the bottom surface of the recessed part 21 to the surface of the die 20 on the X-axis positive side. The openings 24 of the plurality of die nozzles 23 are formed in the surface of the die 20 on the X-axis positive side. Each of the die nozzles 23 discharges a strand 18. Therefore, the die 20 includes the plurality of die nozzles 23 that discharge a plurality of strands.

The recessed part 21 and the die nozzles 23 are connected to each other on the bottom surface of the recessed part 21. That is, the recessed part 21 branches off into the plurality of die nozzles 23 inside the die 20. The molten raw material 17 that has flowed into the recessed part 21 from the opening 22 on the surface of the die 20 on the X-axis negative side branches off into (i.e., flows into) the plurality of die nozzles 23, and is discharged from the plurality of openings 24 on the surface of the die 20 on the X-axis positive side.

The plurality of die nozzles 23 are arranged (i.e., lined up) along the Y-axis direction. The openings 24 of the plurality of die nozzles 23 are formed so as to be arranged (i.e., lined up) along the Y-axis. The molten raw material 17 that has extruded from the die 20 is discharged from the die nozzles 23 as strands 18 (i.e., in the form of strands 18). As described above, the die 20 discharges the molten raw material 17, which has been kneaded by the rotation of the screw 13, as the strands 18.

<Adjustment Unit>

Figure 5:
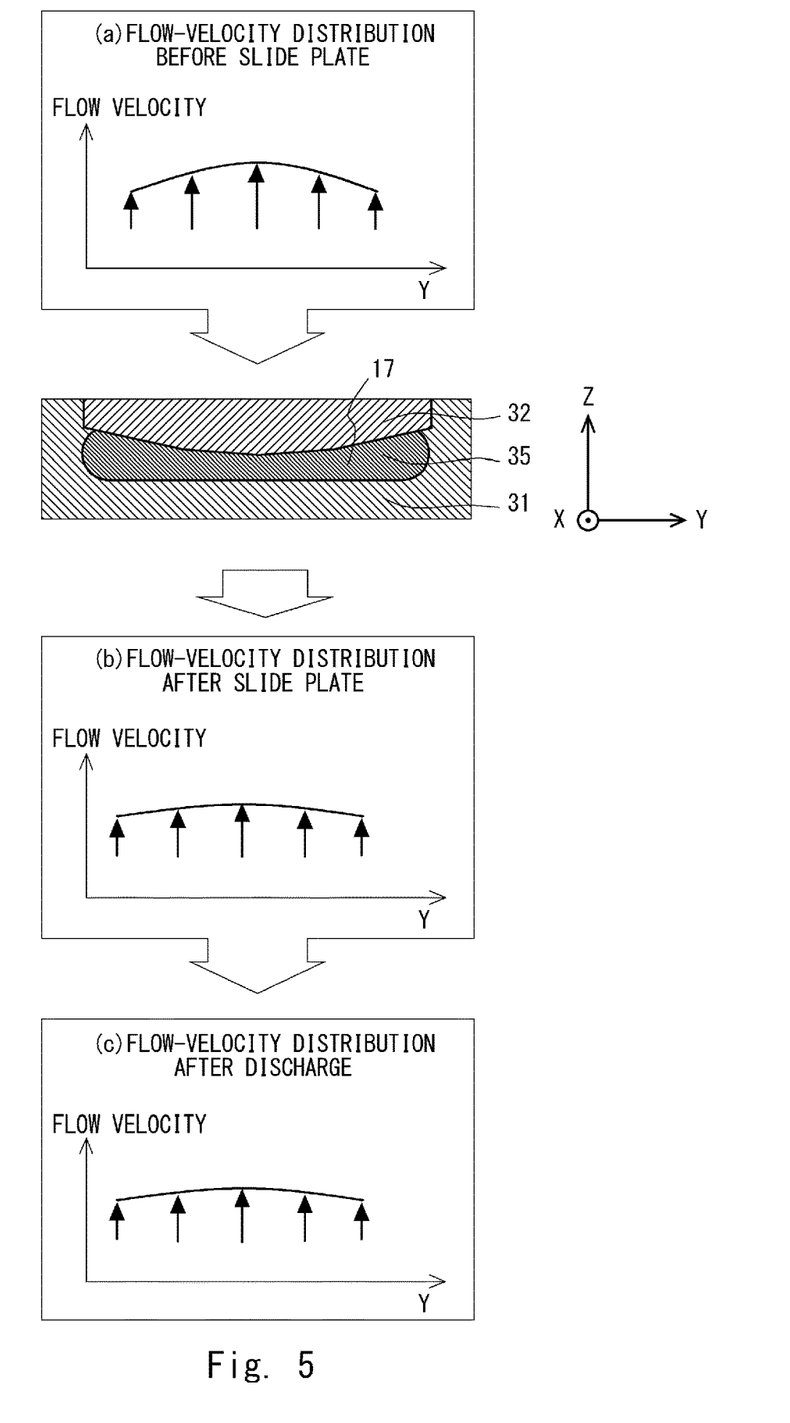
FIG. 5 shows graphs showing examples of flow-velocity distributions of a molten raw material in an extruder according to an embodiment, and a cross-sectional diagram showing an example of an adjustment unit, in which: the horizontal axis of each of the graphs of the flow-velocity distributions indicates positions; the vertical axis indicates flow velocities; and the cross-sectional diagram of the adjustment unit shows a cross-section taken along a line V-V in FIG. 4.
Figure 6:
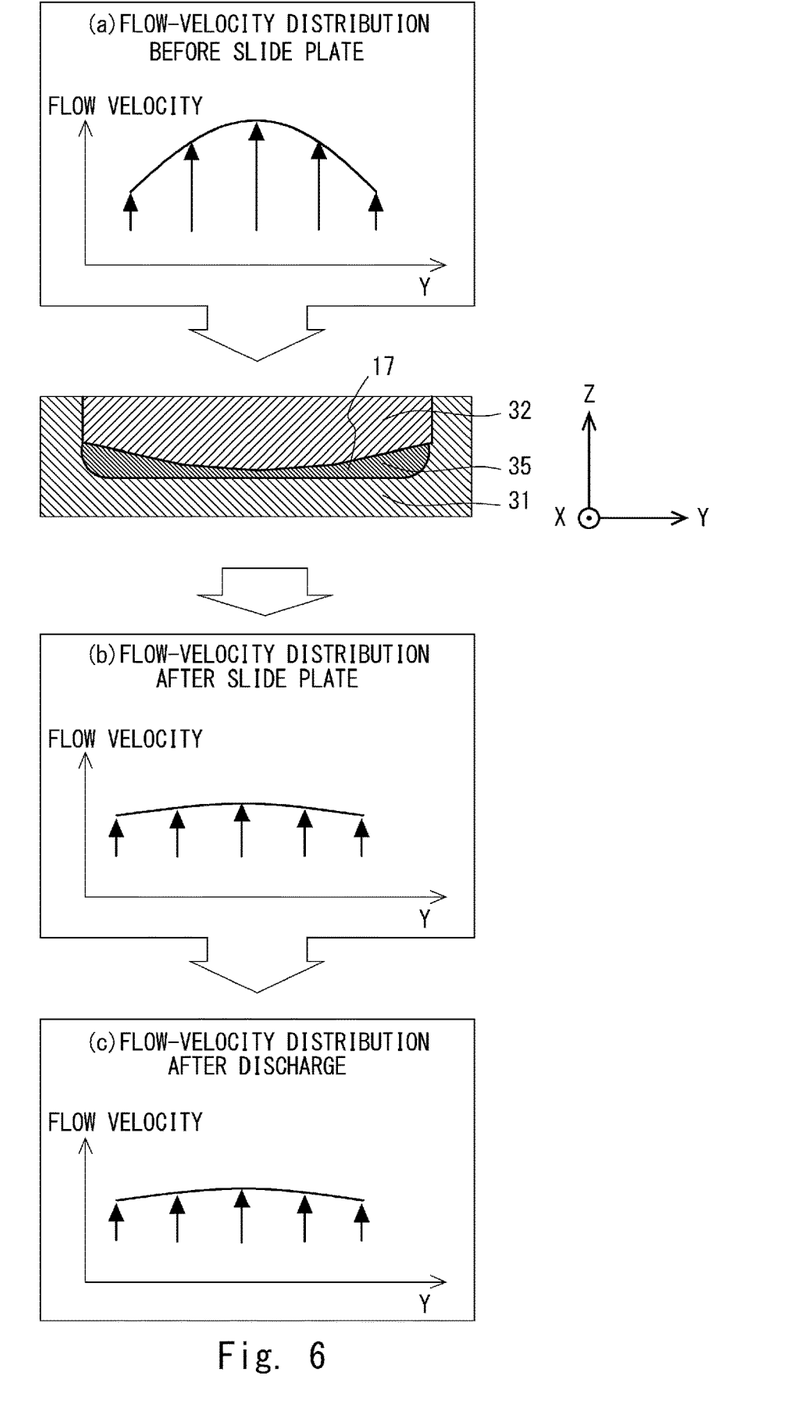
FIG. 6 shows graphs showing examples of flow-velocity distributions of a molten raw material in an extruder according to an embodiment, and a cross-sectional diagram showing an example of an adjustment unit, in which: the horizontal axis of each of the graphs of the flow-velocity distributions indicates positions; the vertical axis indicates flow velocities; and the cross-sectional diagram of the adjustment unit shows a cross-section taken along a line V-V in FIG. 4.

Each of FIGS. 5 and 6 shows graphs showing examples of flow-velocity distributions of a molten raw material in an extruder according to an embodiment, and a cross-sectional diagram showing an example of an adjustment unit, in which: the horizontal axis of each of the graphs of the flow-velocity distributions indicates positions; the vertical axis indicates flow velocities; and the cross-sectional diagram of the adjustment unit shows a cross-section taken along a line V-V in FIG. 4. FIG. 5 shows a case where the viscosity of the molten raw material 17 is low, and FIG. 6 shows a case where the viscosity of the molten raw material 17 is high.

As shown in FIGS. 1 to 6, the adjustment unit 30 is disposed between the cylinder 12 and the die 20. The adjustment unit 30 adjusts the flow-velocity distribution of the molten raw material 17 flowing into the die 20. The adjustment unit 30 includes, for example, a die holder 31 and a slide plate 32.

The die holder 31 includes a flow-in part 33, a flow-out part 34, and a flow path 35. The flow-in part 33 is an opening formed on the surface of the die holder 31 on the X-axis negative side. The flow-in part 33 is connected to the opening of the cylinder 12 on the X-axis positive side. The molten raw material 17 flows from the cylinder 12 into the flow-in part 33.

The flow-out part 34 is an opening formed on the surface of the die holder 31 on the X-axis positive side. The die holder 31 holds the die 20 above the flow-out part 34. The flow-out part 34 is connected to the opening 22 of the die 20. The flow-out part 34 makes the molten raw material 17, which has flowed into the die holder 31, flow out into the die 20.

The flow path 35 is a part of the die holder 31 located (i.e., extending) between the flow-in part 33 and the flow-out part 34. Therefore, the flow path 35 penetrates (i.e., extends through) the die holder 31 in the X-axis direction from the surface of the die holder 31 on the X-axis negative side to the surface thereof on the X-axis positive side. The flow path 35 has a shape elongating in the Y-axis direction. That is, the length of the cross section of the flow path 35 in the Y-axis direction is longer than that in the Z-axis direction, which coincides with the width direction of the flow path 35.

The slide plate 32 is a plate-like component and has a plate surface perpendicular to the X-axis direction. The slide plate 32 is disposed, for example, above the flow path 35. By sliding, i.e., moving, the slide plate 32 downward, the slide plate 32 can be inserted into the flow path 35. By inserting the slide plate 32 into the flow path 35, the cross-sectional area of the flow path 35 is changed. In this way, the adjustment unit 30 adjusts the flow-velocity distribution of the molten raw material 17 flowing into the die 20. The cross-sectional area of the part of the flow path 35 that is blocked as the slide plate 32 is inserted into the flow path 35 is called an insertion amount. The insertion amount in FIG. 6 is larger than that in FIG. 5.

For example, the slide plate 32 protrudes into the flow path 35 more at the center of the flow path 35 in the Y-axis direction than at the ends (i.e., edges) of the flow path 35 in the Y-axis direction. Specifically, when the slide plate 32 disposed above the flow path 35 is viewed in the X-axis direction, the lower end of the slide plate 32, which is inserted into the flow path 35 from above, has a V-shape. That is, the central part of the lower end of the slide plate 32 protrudes downward from both ends (i.e., both edges) thereof. Therefore, by inserting the slide plate 32 into the flow path 35, the adjustment unit 30 makes the length of the flow path 35 in the width direction (the Z-axis direction) at the center thereof smaller than the length of the flow path 35 in the width direction (the Z-axis direction) at both ends (i.e., both edges) thereof.

As shown in (a) Flow Velocity Distribution before Slide Plate 32 in FIG. 5, when the molten raw material 17 flowing through the flow path 35 is a resin having a low viscosity, the molten raw material 17 flows through the flow path 35 with a relatively uniform flow-velocity distribution. For example, the flow velocity at the center of the flow path 35 in the Y-axis direction is higher than that at the ends of the flow path in the Y-axis direction. However, the difference between the flow velocity at the center and that at the ends is small. Therefore, when the viscosity of the molten raw material 17 is low, the insertion amount of the slide plate 32 is reduced. The molten raw material 17, whose flow-velocity distribution has been adjusted by the slide plate 32, flows out into the die 20. As a result, it is possible to make the flow-velocity distribution of the molten raw material 17 flowing into the die 20 uniform as shown in (b) Flow Velocity Distribution after Slide Plate 32 in FIG. 5. Further, when the flow-velocity distribution of the molten raw material 17 flowing into the die 20 is uniform, it is possible to make the discharge amount of the strands 18 uniform as shown in (c) Flow Velocity Distribution after Discharge in FIG. 5.

As shown in (a) Flow Velocity Distribution before Slide Plate 32 in FIG. 6, when the molten raw material 17 flowing through the flow path 35 is a resin having a high viscosity, the flow velocity of the molten raw material 17 flowing through the flow path 35 at the center thereof is higher than that at the ends (i.e., the edges) of the flow path 35. As compared to FIG. 5, the difference between the flow velocity at the center and that at the ends is large. Therefore, when the viscosity of the molten raw material 17 is high, the insertion amount of the slide plate 32 is increased. As a result, it is possible to make the flow-velocity distribution of the molten raw material 17 flowing into the die 20 uniform as shown in (b) Flow Velocity Distribution after Slide Plate 32 in FIG. 6. Further, when the flow-velocity distribution of the molten raw material 17 flowing into the die 20 is uniform, it is possible to make the discharge amount of the strands 18 uniform as shown in (c) Flow Velocity Distribution after Discharge in FIG. 6.

<Detection Unit>

The detection unit 40 detects the discharge amount of the strands 18 discharged from the die 20. For example, the detection unit 40 detects, as the discharge amount, the thicknesses of the plurality of strands 18 discharged from the plurality of die nozzles 23. The detection unit 40 is, for example, an image sensor. The image sensor takes an image of the plurality of strands 18 discharged from the plurality of die nozzles 23. Then, the image sensor detects the thicknesses of the plurality of strands 18 from the taken image of the strands 18. The detection unit 40 outputs the detected discharge amount of the strands 18 to the control unit 50.

Figure 7:
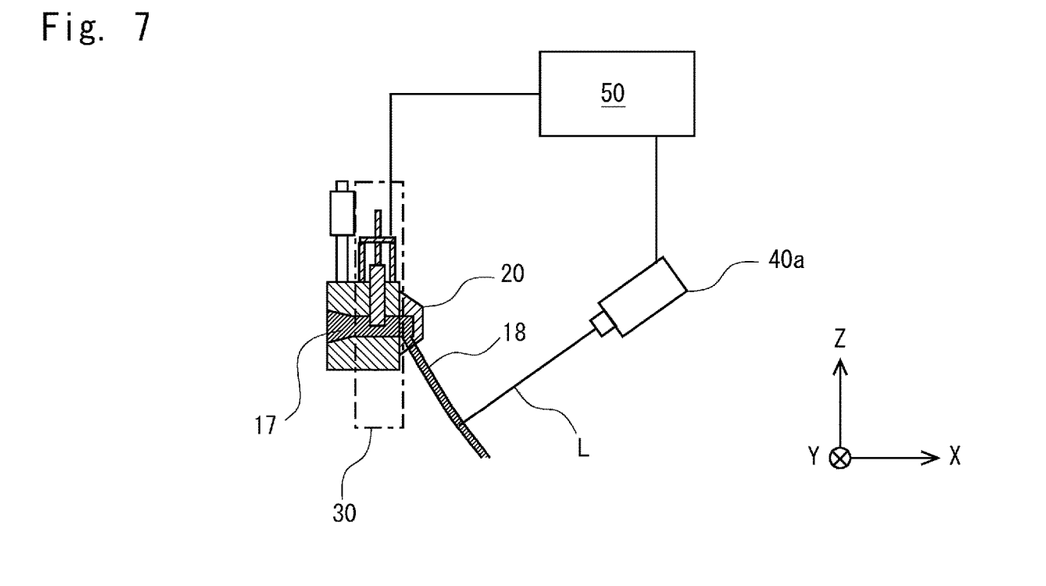
FIG. 7 shows an example of a detection unit of an extruder according to a first modified example of an embodiment.

FIG. 7 shows an example of a detection unit of an extruder according to a first modified example of the embodiment. As shown in FIG. 7, the detection unit 40 may be a laser measuring device 40*a*. The laser measuring device 40*a* applies a laser beam L to the plurality of strands 18 discharged from the plurality of die nozzles 23. Then, the laser measuring device 40a detects the thicknesses of the plurality of strands 18 from the laser beam L that has been reflected by the strands 18.

Figure 8:
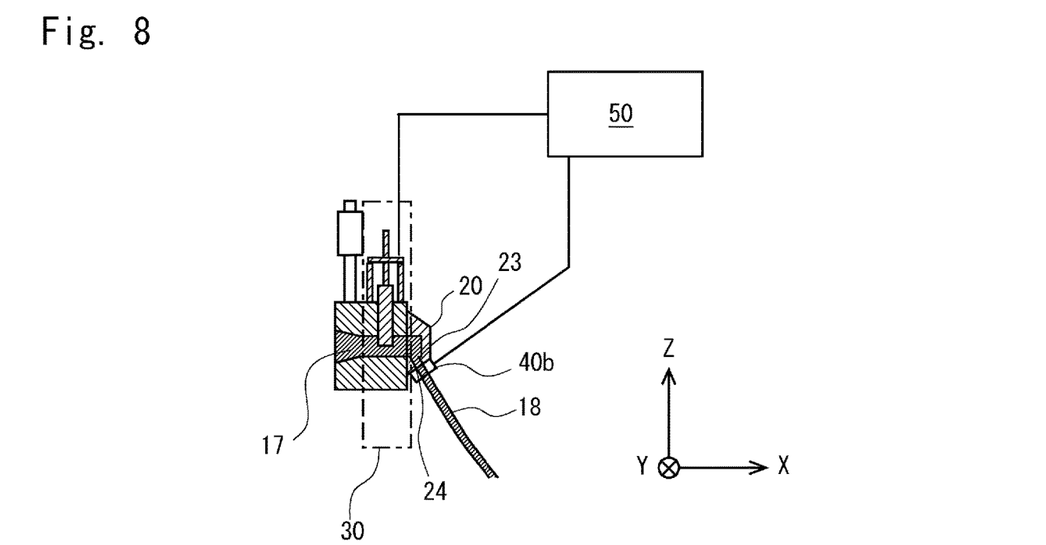
FIG. 8 shows an example of a detection unit of an extruder according to a second modified example of an embodiment.

FIG. 8 shows an example of a detection unit of an extruder according to a second modified example of the embodiment. As shown in FIG. 8, the detection unit 40 may be a pressure sensor 40b. The pressure sensor 40b is attached to the openings 24 of the die nozzles 23. The pressure sensor 40b measures the pressure of the strand 18 discharged from the die nozzle 23. Then, the pressure sensor 40b detects the thicknesses of the plurality of strands 18 based on the pressures of the plurality of strands 18.

<Control Unit>

The control unit 50 is connected to the detection unit 40 through a wired or wireless signal line or the like. The control unit 50 receives information about the discharge amount of the strands 18 from the detection unit 40. Further, the control unit 50 is connected to the adjustment unit 30 through a signal line or the like. The control unit 50 transmits a signal for adjusting the flow-velocity distribution to the adjustment unit 30. The control unit 50 is, for example, a PC (Personal Computer), a microcomputer, or the like.

The control unit 50 performs feedback control for the flow-velocity distribution of the molten raw material 17 flowing into the die 20 based on the detected discharge amount of the strands 18. For example, the control unit 50 calculates an adjustment amount for the flow-velocity distribution based on the detected discharge amount. Then, the control unit 50 makes the adjustment unit 30 adjust the flow-velocity distribution based on the calculated adjustment amount. In this way, the control unit 50 performs feedback control for the flow-velocity distribution.

Specifically, the control unit 50 reads a pre-set target value for the variations of the thicknesses of the strands 18. The target value is stored, for example, in a memory or the like (not shown) in advance. Next, the control unit 50 calculates the variations of the thickness based on the detected thickness of the strand 18. The calculated variations of the thickness are called a calculated value. Next, the control unit 50 compares the pre-set target value with the calculated value. Then, for example, when the difference between these values is larger than a predetermined threshold, the control unit 50 calculates an adjustment amount by which the difference between these values becomes smaller than or equal to the predetermined threshold.

For example, the control unit 50 calculates, as the adjustment amount, an insertion amount by which the slide plate 32 is inserted into the flow path 35. The control unit 50 makes the adjustment unit 30 insert the slide plate 32 into the flow path 35 so that the actual insertion amount becomes equal to the calculated insertion amount. The larger the difference between the target value for the variations of the thickness of the strand 18 and the calculated value of the variations calculated from the detected thickness of the strand 18 is, the more the control unit 50 increases the insertion amount of the slide plate 32. Further, the larger the viscosity of the molten raw material 17 is, the more the control unit 50 increases the insertion amount of the slide plate 32.

<Method for Manufacturing Strand>

Figure 9:
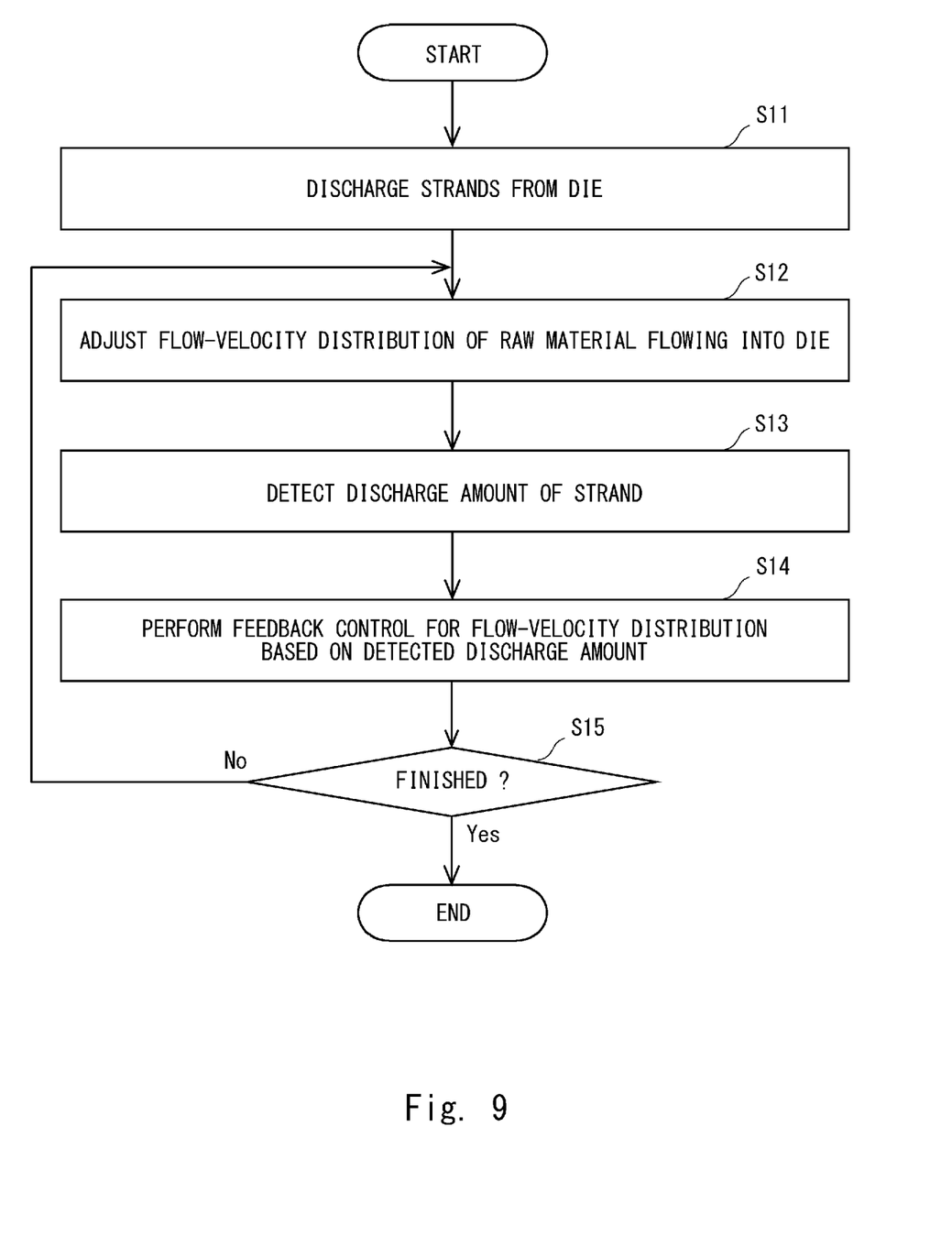
FIG. 9 is a flowchart showing an example of a method for manufacturing strands according to an embodiment.
Figure 10:
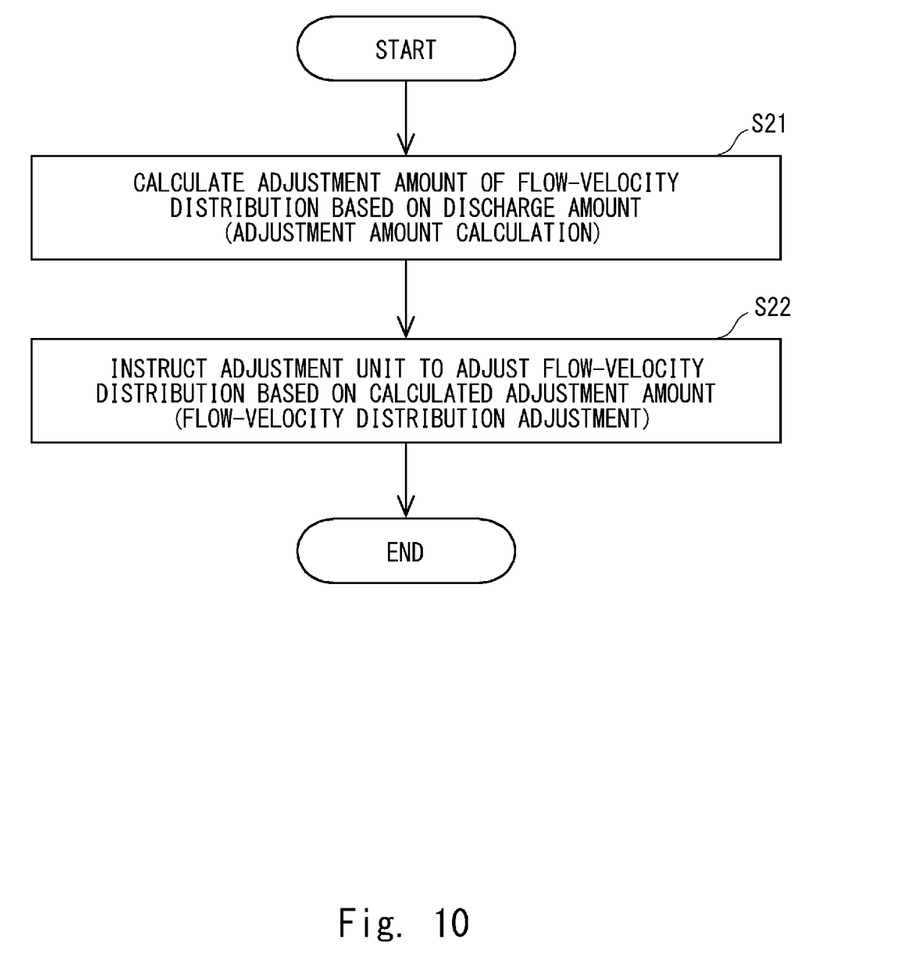
FIG. 10 is a flowchart showing an example of feedback control performed in a method for manufacturing strands according to an embodiment.
Figure 11:
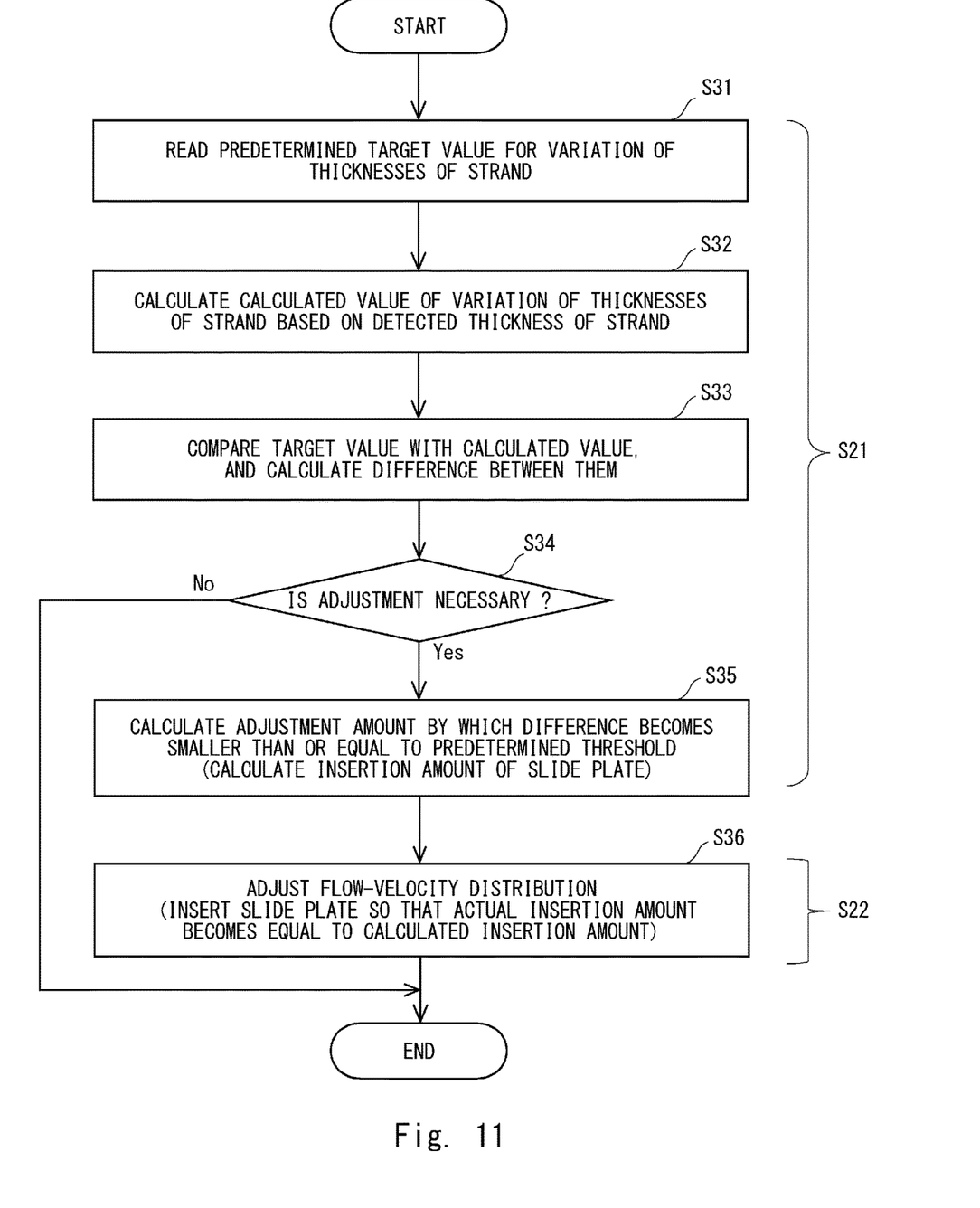
FIG. 11 is a flowchart showing an example of feedback control performed in a method for manufacturing strands according to an embodiment.

Next, a method for manufacturing strands according to this embodiment will be described. FIG. 9 is a flowchart showing an example of the method for manufacturing strands according to the embodiment. Each of FIGS. 10 and 11 is a flowchart showing an example of feedback control performed in the method for manufacturing strands according to the embodiment.

Firstly, as shown in a step S11 in FIG. 9, strands 18 are discharged. Specifically, the drive unit 10 and the speed reducer 11 of the extruder 1 are activated. Then, the screw 13, which rotates around the rotation axis extending in one direction, is rotated by the drive unit 10 and the speed reducer 11. The screw 13 is housed in the cylindrical cylinder 12 extending in the one direction. The drive unit 10 and speed reducer 11 are disposed at one end of the cylinder 12 (i.e., near one end of the cylinder 12).

A raw material 16 is supplied from the feeder 14 into the cylinder 12. The raw material 16 supplied into the cylinder 12 is kneaded by the screw 13, and is melted by heat from a heater(s) (not shown) and the effect of the rotation of the screw 13 at the same time. The molten raw material 17 is extruded by the rotation of the screw 13. In this way, the molten raw material 17, which has been kneaded by the rotation of the screw 13, is extruded from the die 20 and is discharged as strands 18 (i.e., in the form of strands 18).

To extrude the molten raw material 17 from the die 20 and discharge it as strands 18, the die 20 may include a plurality of die nozzles 23 that discharge a plurality of strands 18. In such a case, the plurality of die nozzles 23 may be arranged (e.g., lined up) in the Y-axis direction.

Next, as shown in a step S12, the flow-velocity distribution of the molten raw material 17 flowing into the die 20 is adjusted. Specifically, the flow-velocity distribution of the molten raw material 17 flowing into the die 20 is adjusted by the adjustment unit 30 disposed between the cylinder 12 and the die 20. The adjustment unit 30 may include a die holder 31 and a slide plate 32. The die holder 31 includes a flow-in part 33 through which the molten raw material 17 flows from the cylinder 12, a flow-out part 34 through which the molten raw material 17, which has flowed into the cylinder 12, flows into the die 20, and a flow path 35 located (i.e., extending) between the flow-in part 33 and the flow-out part 34. The die holder 31 holds the die 20 above the flow-out part 34. The slide plate 32 changes the cross-sectional area of the flow path 35 as it is inserted into the flow path 35.

Next, as shown in a step S13, the discharge amount of the strands 18 discharged from the die 20 is detected. As the discharge amount, the thicknesses of the plurality of strands 18 discharged from the plurality of die nozzles 23 may be detected. When the thicknesses of the plurality of strands 18 are detected, the thicknesses of the plurality of strands 18 may be detected by using an image sensor. Alternatively, the thicknesses of the plurality of strands 18 may be detected by using a laser measuring device 40a. Alternatively, the thicknesses of the plurality of strands 18 may be detected by using a pressure sensor(s) 40b attached to the die nozzle 23, i.e., based on the pressure(s) of the strand(s) 18 discharged from the die nozzle(s) 23.

Next, as shown in a step S14, feedback control for the flow-velocity distribution is performed based on the detected discharge amount. When the feedback control is performed, it may include an adjustment amount calculation step as shown in a step S21 in FIG. 10, and a flow-velocity distribution adjustment step as shown in a step S22. In the adjustment amount calculation step, the adjustment amount for the flow-velocity distribution of the molten raw material 17 flowing into the die 20 is calculated based on the discharge amount of strands discharged from the die 20. In the flow-velocity distribution adjustment step, the adjustment unit 30 is made to adjust the flow-velocity distribution based on the calculated adjustment amount.

The adjustment amount calculation step in the step S21 will be described hereinafter in detail with reference to FIG. 11. As shown in a step S31 in FIG. 11, in the adjustment amount calculation step, firstly, a pre-set target value for the variations of the thicknesses of the strands 18 is read. Next, as shown in a step S32, the calculated value of the variations of the thickness is calculated from the actually-detected thickness of the strands 18. For example, the control unit 50 calculates the calculated value from the thicknesses of the plurality of strands 18 detected by the detection unit 40. Next, as shown in a step S33, the target value and the calculated value are compared, and a difference between these values is calculated.

Then, as shown in a step S34, it is determined whether an adjustment is necessary. For example, the control unit 50 determines whether the difference between the target value and the calculated value is larger than a predetermined threshold. When no adjustment is necessary, e.g., when the difference between the target value and the calculated value is smaller than the predetermined threshold, the process is finished.

On the other hand, when an adjustment is necessary in the step S34, e.g., when the difference between the target value and the calculated value is larger than the predetermined threshold, an adjustment amount by which the difference between the target value and the calculated value becomes smaller than or equal to the predetermined threshold is calculated as shown in a step S35. Specifically, an insertion amount (e.g., an insertion length) by which the slide plate 32 is inserted into the flow path 35 is calculated as the adjustment amount.

For example, as an example of the calculation of the insertion amount, the flow path 35 is designed so that the length of its cross section in the Y-axis direction becomes longer than that in the width direction (the Z-axis direction), and the slide plate 32 is designed so that it protrudes into the flow path 35 more at the center the flow path 35 in the Y-axis direction than at the ends (i.e., edges) of the flow path 35. Further, by inserting the slide plate 32 into the flow path 35, the length of the flow path 35 in the width direction (the Z-axis direction) at the center thereof is made shorter than the length of the flow path 35 in the width direction (the Z-axis direction) at both ends (i.e., edges) thereof. In this case, the longer the difference between the target value and the calculated value is, the more the insertion amount of the slide plate 32 is increased. Further, the larger the viscosity of the molten raw material 17 is, the more the insertion amount of the slide plate 32 is increased.

Next, as shown in a step S36, the adjustment unit 30 is made to adjust the flow-velocity distribution based on the calculated adjustment amount. Specifically, the adjustment unit 30 is made to insert the slide plate 32 into the flow path 35 so that the actual insertion amount becomes equal to the calculated insertion amount. In this way, the control unit 50 performs feedback control. The steps S31 to S35 in FIG. 11 correspond to the step S21 in FIG. 10, and the step S36 in FIG. 11 corresponds to the step S22 in FIG. 10.

Note that, in the method for manufacturing strands shown in FIG. 9, the control unit 50 determines, as appropriate, whether to terminate the feedback control for the discharge amount of the strands. For example, after the step S14, the control unit 50 may determine whether to terminate the feedback control for the discharge amount of the strands 18 as shown in a step S15. When the control unit 50 terminates the feedback control for the discharge amount of the strands 18, it finishes the process.

When the control unit 50 does not terminate the feedback control for the discharge amount of the strands, the process returns to the step S12 in FIG. 9, and the adjustment unit 30 adjusts the flow-velocity distribution of the molten raw material flowing into the die 20 so that the flow-velocity distribution calculated by the control unit 50 is achieved. Specifically, the slide plate 32 is inserted into the flow path 35 so that the actual insertion amount becomes equal to the insertion amount calculated by the control unit 50. Then, the steps S12 to S15 are repeated. In this way, the extruder 1 can perform feedback control for the discharge amount of the strands 18.

Next, advantageous effects of this embodiment will be described. The extruder 1 according to this embodiment performs feedback control for the flow-velocity distribution of the molten raw material 17 flowing into the die 20 based on the discharge amount of the strands 18 discharged from the die 20. Therefore, it is possible to optimize the discharge amount of the strands 18 and make the discharge amount of the strands 18 uniform while continuing the manufacturing of the strands 18.

Further, there is no need to replace any component such as the die 20 in order to make the discharge amount of the strands 18 discharged from the die 20 uniform. Therefore, there is no need to stop the extruder 1, and hence productivity can be improved.

Since the die 20 includes a plurality of die nozzles 23, a plurality of strands 18 can be simultaneously discharged. Therefore, productivity can be improved.

The adjustment unit 30 changes the cross-sectional area of the flow path 35 of the molten raw material 17 by inserting the slide plate into the flow path 35, and thereby adjusts the flow-velocity distribution of the molten raw material flowing into the die 20. Therefore, it is possible to use the insertion amount of the slide plate 32 as the adjustment amount, and thereby to accurately adjust the flow-velocity distribution.

The slide plate 32 protrudes into the flow path 35 more at the center of the flow path 35 than at the ends (i.e., edges) of the flow path 35. Therefore, by inserting the slide plate 32 into the flow path 35, the length of the flow path 35 in the width direction at the center thereof can be made smaller than the length of the flow path 35 in the width direction at the ends (i.e., edges) thereof. By adopting the above-described configuration, it is possible to make the flow-velocity distribution of the molten raw material 17 flowing through the flow path 35 uniform especially when the viscosity of the molten raw material 17 is high. Therefore, the discharge amount of the strands 18 can be made uniform.

The detection unit 40 may be an image sensor or a laser measuring device 40a that detects the thicknesses of the strands 18. Further, the detection unit 40 may be a pressure sensor(s) 40b that detects the pressure(s) of the strand(s) 18 discharged from the die nozzle(s) 23. In this way, it is possible to accurately detect the thicknesses of the strands 18 as the discharge amount of the strands 18.

The present invention made by the inventors of the present application has been described above in a concrete manner based on embodiments. However, the present invention is not limited to the above-described embodiments, and needless to say, various modifications can be made without departing from the spirit and scope of the present invention.

This application is based upon and claims the benefit of priority from Japanese patent application No. 2019-190693, filed on Oct. 18, 2019, the disclosure of which is incorporated herein in its entirety by reference.

REFERENCE SIGNS LIST

1 EXTRUDER
10 DRIVE UNIT

11 SPEED REDUCER
12 CYLINDER
13 SCREW
14 FEEDER
15 PRESSURE GAUGE/THERMOMETER
16 RAW MATERIAL
17 MOLTEN MATERIAL
18 STRANDS
20 DIE
21 RECESSED PART
22 OPENING
23 DIE NOZZLE
24 OPENING
30 ADJUSTMENT UNIT
31 DIE HOLDER
32 SLIDE PLATE
40 DETECTION UNIT
40a LASER MEASURING DEVICE
40b PRESSURE SENSOR
50 CONTROL UNIT
60 STRAND BATH
61 STRAND CUTTER

The invention claimed is:

1. An extruder comprising:
a screw configured to rotate around a rotation axis extending in one direction;
a cylindrical cylinder extending in the one direction, the cylinder being configured to house the screw;
a drive unit disposed at one end of the cylinder, the drive unit being configured to rotate the screw;
a die disposed at the other end of the cylinder, the die being configured to discharge a raw material kneaded by the rotation of the screw as a strand;
an adjustment unit disposed between the cylinder and the die, the adjustment unit being configured to adjust a flow-velocity distribution of the raw material flowing into the die, the adjustment unit comprising:
a die holder comprising a flow-in part through which the raw material flows from the cylinder, a flow-out part through which the raw material, which has flowed into the die holder, flows out into the die, and a flow path disposed between the flow-in part and the flow-out part, and
a slide plate configured to change a cross-sectional area of the flow path as the slide plate is inserted into the flow path;
a detection unit configured to detect a discharge amount of the strand discharged from the die; and
a control unit configured to perform feedback control for the flow-velocity distribution based on the discharge amount,
wherein
the die comprises a plurality of die nozzles arranged in another direction perpendicular to the one direction and configured to discharge a plurality of strands;
the detection unit detects, as the discharge amount, thicknesses of the plurality of strands discharged from the plurality of die nozzles;
the control unit:
calculates a value corresponding to variations in the thicknesses of the plurality of strands detected by the detection unit;
compares the calculated value with a pre-set target value for variations of the thicknesses of the plurality of strands;
calculates an adjustment amount for the flow-velocity distribution based on the discharge amount when a difference between the calculated value and the pre-set value is larger than a predetermined threshold; and
makes the adjustment unit adjust the flow-velocity distribution based on the calculated adjustment amount,
wherein
the slide plate includes a protruding portion at a center thereof so as to be protruding into the flow path more at the center of the flow path than at an end thereof in the other direction of the flow path; and
the control unit calculates, as the adjustment amount, an insertion amount by which the slide plate is inserted into the flow path.

2. The extruder according to claim 1, wherein
the control unit calculates the adjustment amount so that the difference becomes smaller than or equal to the predetermined threshold.

3. The extruder according to claim 2, wherein the detection unit is an image sensor configured to detect the thickness.

4. The extruder according to claim 2, wherein the detection unit is a laser measuring device configured to detect the thickness.

5. The extruder according to claim 2, wherein the detection unit is a pressure sensor attached to the die nozzle, and the pressure sensor detects the thickness based on a pressure of the strand discharged from the die nozzle.

6. The extruder according to claim 2, wherein
the control unit makes the adjustment unit insert the slide plate into the flow path so that the actual insertion amount becomes equal to the calculated insertion amount.

7. The extruder according to claim 6, wherein
a length of a cross section of the flow path in the other direction is longer than that in a width direction perpendicular to both the one direction and the other direction,
and
the adjustment unit makes the length of the flow path at the center of the flow path in the width direction shorter than that at both ends thereof in the width direction by inserting the slide plate into the flow path.

8. The extruder according to claim 7, wherein the longer the difference is, the more the control unit increases the insertion amount.

9. The extruder according to claim 7, wherein the larger a viscosity of the raw material is, the more the control unit increases the insertion amount.

* * * * *